US012361688B2

(12) United States Patent
Stent et al.

(10) Patent No.: US 12,361,688 B2
(45) Date of Patent: Jul. 15, 2025

(54) SYSTEM AND METHOD FOR BUILDING MULTI-VIEW MACHINE LEARNING DATASETS FROM FLEET DATA

(71) Applicant: TOYOTA RESEARCH INSTITUTE, INC., Los Altos, CA (US)

(72) Inventors: Simon A. I. Stent, London (GB); Dennis Park, Fremont, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 359 days.

(21) Appl. No.: 17/955,159

(22) Filed: Sep. 28, 2022

(65) Prior Publication Data
US 2024/0104905 A1 Mar. 28, 2024

(51) Int. Cl.
G06V 10/774 (2022.01)
G06V 20/58 (2022.01)
H04W 4/021 (2018.01)
H04W 4/46 (2018.01)

(52) U.S. Cl.
CPC .......... *G06V 10/7747* (2022.01); *G06V 20/58* (2022.01); *H04W 4/021* (2013.01); *H04W 4/46* (2018.02); *G06V 2201/07* (2022.01)

(58) Field of Classification Search
CPC .............. G06V 10/7747; G06V 20/58; G06V 2201/07; H04W 4/46; H04W 4/021
See application file for complete search history.

(56) References Cited

U.S. PATENT DOCUMENTS

| | | | | |
|---|---|---|---|---|
| 9,641,763 | B2* | 5/2017 | Bernal | G08B 13/19645 |
| 10,928,830 | B1* | 2/2021 | Tran | B60W 30/12 |
| 11,124,132 | B2* | 9/2021 | Russell | B60R 11/04 |
| 11,182,598 | B2* | 11/2021 | Sriram | G06T 7/246 |
| 11,275,173 | B2* | 3/2022 | Wang | G01S 13/58 |
| 11,295,521 | B2* | 4/2022 | Caccin | G01C 21/32 |
| 11,468,688 | B2* | 10/2022 | Cheng | G06V 20/58 |
| 11,495,064 | B2* | 11/2022 | Higuchi | G08G 1/161 |
| 11,603,043 | B2* | 3/2023 | Nagata | H04N 7/181 |
| 11,979,847 | B2* | 5/2024 | Lu | H04W 64/003 |
| 2021/0235057 | A1 | 7/2021 | Han et al. | |

FOREIGN PATENT DOCUMENTS

CN 113298084 A 8/2021

OTHER PUBLICATIONS

Zhang, et al., "Data-Driven Point Cloud Objects Completion," Sensors, vol. 19, No. 7, pp. 1514-1532, Mar. 2, 2019.

(Continued)

*Primary Examiner* — Gregory M Desire
(74) *Attorney, Agent, or Firm* — SEYFARTH SHAW LLP (57) ABSTRACT

A method for multi-view dataset formation from fleet data is described. The method includes detecting at least a pair of vehicles within a vicinity of one another, and having overlapping viewing frustums of a scene. The method also includes triggering a capture of sensor data from the pair of vehicles. The method further includes synchronizing the sensor data captured by the pair of vehicles. The method also includes registering the sensor data captured by the pair of vehicles within a shared coordinate system to form a multi-view dataset of the scene.

17 Claims, 7 Drawing Sheets

(56) References Cited

OTHER PUBLICATIONS

Hu, et al., "Online Multi-Object Tracking Using CNN-based Single Object Tracker with Spatial-Temporal Attention Mechanism," found at https://arxiv.org/abs/1708.02843, submitted Aug. 9, 2017.

Barazzetti, et al., "Can We Use Low-Cost 360 Degree Cameras to Create Accurate 3D Models?" ISPRS International Archives of the Photogrammetry Remote Sensing and Spatial Information Sciences, vol. XLII-2, pp. 69-75, 2018.

Zou, et al., "Silhouette Guided Point Cloud Reconstruction beyond Occlusion," found at https://arxiv.org/abs/1907.12253, submitted Jul. 29, 2019.

Barazzetti, Luigi, "Point-Cloud Occlusion Recovery Using Feedforward Neural Networks," Advanced Engineering Informatics, vol. 38, pp. 605-619, Oct. 2018.

Sanguinetti, et al., "Missing Data in Kernel PCA," Proceedings of 17th European Conference on Machine Learning, 2006.

\* cited by examiner

SYSTEM AND METHOD FOR BUILDING MULTI-VIEW MACHINE LEARNING DATASETS FROM FLEET DATA

BACKGROUND

Field

Certain aspects of the present disclosure generally relate to machine learning and, more particularly, a system and method for building multi-view machine learning datasets from fleet data.

Background

Autonomous agents rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

An ego vehicle may rely on a trained convolutional neural network (CNN) to identify objects within areas of interest in an image of a surrounding scene of the ego vehicle. For example, a CNN may be trained to identify objects captured by sensors and/or cameras. For example, these sensors may include light detection and ranging (LIDAR) sensors, sonar sensors, red-green-blue (RGB) cameras, RGB-depth (RGB-D) cameras, and the like. The sensors and/or cameras may be in communication with a device, such as the ego vehicle.

A 3D scene surrounding an ego vehicle may be captured using forward-facing cameras, in which portions of the 3D scene surrounding the ego vehicle may be occluded. Perceiving occluded portions of 3D scenes is a long-standing challenge in computer vision and artificial intelligence. The core problem is teaching machines a notion of object permanence; namely, a notion that objects continue to exist even when they are temporarily invisible due to occlusion. The common current approach to handle this problem is reasoning about occlusion at an object level, which involves manually annotated frames, and, therefore, is not scalable.

SUMMARY

A method for multi-view dataset formation from fleet data is described. The method includes detecting at least a pair of vehicles within a vicinity of one another, and having overlapping viewing frustums of a scene. The method also includes triggering a capture of sensor data from the pair of vehicles. The method further includes synchronizing the sensor data captured by the pair of vehicles. The method also includes registering the sensor data captured by the pair of vehicles within a shared coordinate system to form a multi-view dataset of the scene.

A non-transitory computer-readable medium having program code recorded thereon for multi-view dataset formation from fleet data is described. The program code is executed by a processor. The non-transitory computer-readable medium includes program code to detect at least a pair of vehicles within a vicinity of one another, and having overlapping viewing frustums of a scene. The non-transitory computer-readable medium also includes program code to trigger a capture of sensor data from the pair of vehicles. The non-transitory computer-readable medium further includes program code to synchronize the sensor data captured by the pair of vehicles. The non-transitory computer-readable medium also includes program code to register the sensor data captured by the pair of vehicles within a shared coordinate system to form the multi-view dataset of the scene.

A system for multi-view dataset formation from fleet data is described. The system includes a vehicle detection module to detect at least a pair of vehicles within a vicinity of one another, and having overlapping viewing frustums of a scene. The system also includes a sensor data trigger module to trigger a capture of sensor data from the pair of vehicles. The system further includes a sensor data synchronization module to synchronize the sensor data captured by the pair of vehicles. The system also includes a multi-view dataset formation module to register the sensor data captured by the pair of vehicles within a shared coordinate system to form the multi-view dataset of the scene.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

An ego vehicle may rely on a trained convolutional neural network (CNN) to identify objects within areas of interest in an image of a surrounding scene of the ego vehicle. For example, a CNN may be trained to identify objects captured by sensors and/or cameras. For example, these sensors may include light detection and ranging (LIDAR) sensors, sonar sensors, red-green-blue (RGB) cameras, RGB-depth (RGB-D) cameras, and the like. The sensors and/or cameras may be in communication with a device, such as the ego vehicle.

A 3D scene surrounding an ego vehicle may be captured using forward-facing cameras, in which portions of the 3D scene surrounding the ego vehicle may be occluded. Perceiving occluded portions of 3D scenes is a long-standing challenge in computer vision and artificial intelligence. The core problem is teaching machines a notion of object permanence; namely, a notion that objects continue to exist even when they are temporarily invisible due to occlusion. The common current approach to handle this problem is reasoning about occlusion at an object level, which involves manually annotated frames, and, therefore, is not scalable.

When an object becomes occluded in video, the location and visual structure of the object are often still predictable. In particular, developmental psychologists have demonstrated that shortly after birth, children learn how objects persist during occlusion, and evidence suggests animals perform similar reasoning. Occlusions are fundamental to computer vision, and predicting the contents behind them underlies many applications in video analysis. Current works side-step the problem of occlusions by reasoning about only the objects that are visible. For example, object completion works operate on single objects that are at least partially visible in every viewpoint and dynamic works do not handle moving objects. Tracking applications handle invisible people/objects using linear extrapolation based on when the object was last visible or are guided with x-ray annotations, which are infeasible in the real-world.

The field has developed a number of deep learning methods to operate on point clouds, which, due to their attractive properties, have emerged as the representation of choice for numerous 3D tasks. Point clouds are sparse, making them particularly scalable to large scenes. Nevertheless, solving the occlusion problem involves a video representation that (a) uses evidence from the previous frames in order to (b) generate the new points that are not observed in the subsequent frames. Because point clouds are possible to collect at scale, points clouds offer an excellent source of data for learning to predict behind occlusions in video. Nevertheless, these representations involve the capacity to create points conditioned on their context.

Some aspects of the present disclosure are directed to a system and method for building multi-view machine learning datasets from fleet data to solve the occlusion problem noted above. As described, multi-view video datasets refer to videos of the same scene captured synchronously from different viewpoints (e.g., with overlap). Aspects of the present disclosure recognize that multi-view video datasets are very valuable for machine learning to train certain types of geometry-aware models.

For example, consider the case of two vehicles driving in opposite directions along a road with parked cars on either side and pedestrians moving in between those parked cars and occasionally stepping into the street. Prior to the vehicles passing one another, there is a period of time where they see the same scene from opposite directions. In some aspects of the present disclosure, synchronized video data is captured from both vehicles, in which one vehicle may see pedestrians that are largely occluded from the viewpoint of the other vehicle. Because the data is synchronized in this aspect of the present disclosure, registration of the cameras together in space (e.g., using simultaneous localization and mapping (SLAM) to a known map), enables localization of the position of the pedestrians in a non-occluded view.

In some aspects of the present disclosure, localization of the position of the pedestrians in a non-occluded view is performed using instance segmentation and monocular depth estimation, or with a range sensor. In some aspects of the present disclosure, localization of the position of the pedestrians in the non-occluded view provides approximate ground truth position estimation of the same pedestrian in the occluded view. Thus, with multiple views of the scene from different angles, it is possible to generate richer ground truth (including, e.g., the tracks of objects which can barely be seen from certain viewpoints), which can then be used to train more robust models (e.g., a pedestrian detector which can infer that a pedestrian is occluded behind a vehicle due to a subtle motion or shadow signal, or a reflection from a nearby object).

Figure 1:
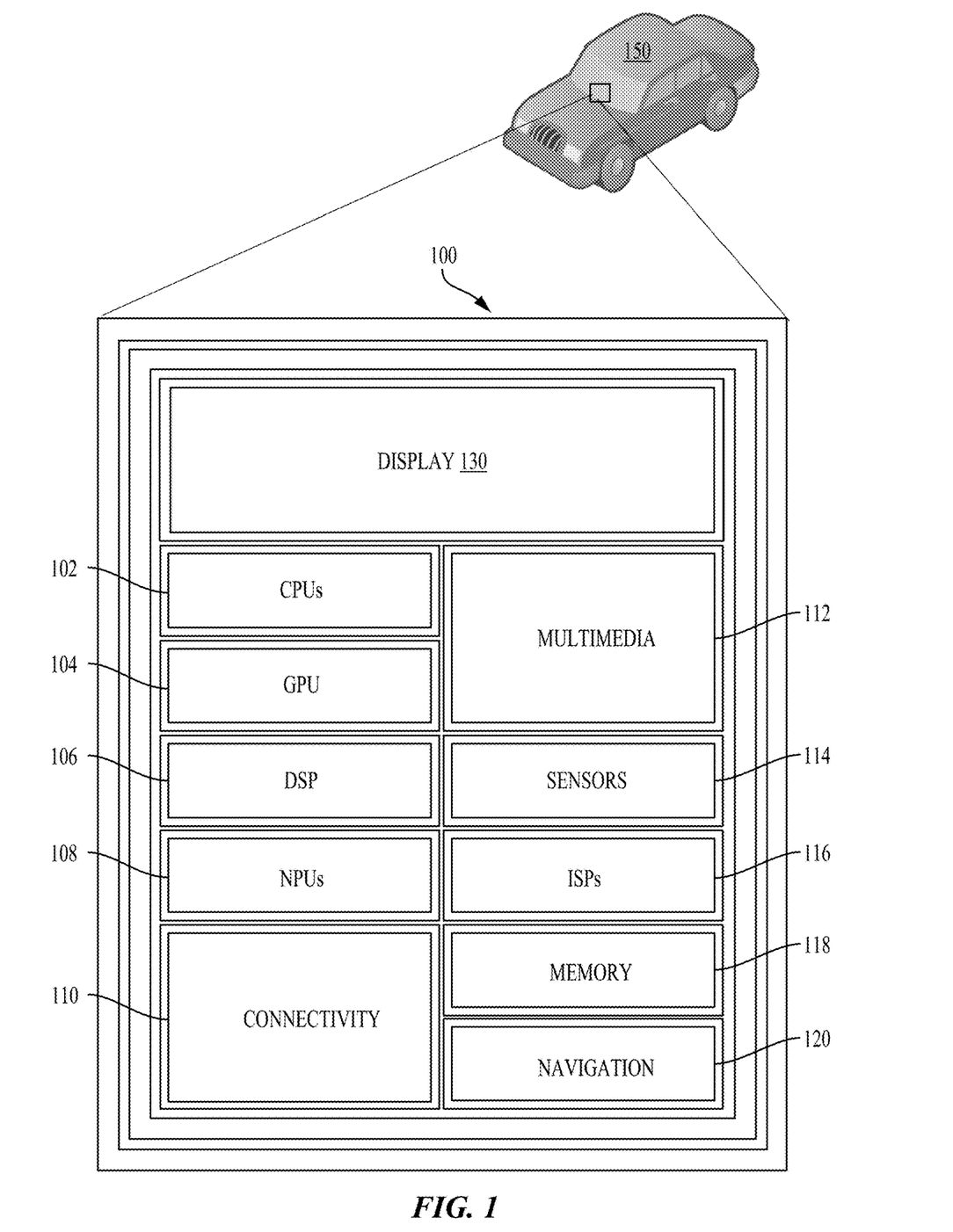
FIG. 1 illustrates an example implementation of designing a system using a system-on-a-chip (SOC) for multi-view machine learning datasets from fleet data, in accordance with aspects of the present disclosure.

FIG. 1 illustrates an example implementation of the aforementioned system and method for building multi-view machine learning datasets from fleet data using a system-on-a-chip (SOC) 100 of an ego vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth© connectivity, and the like. In addition, a multimedia processor 112 in combination with a display 130 may, for example, classify and categorize semantic keypoints of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system (GPS).

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for 4D scene completion in an image captured by the sensor processor 114. The instructions loaded into a processor (e.g., CPU 102) may also include code for planning and control (e.g., intention prediction of the ego vehicle) in response to detecting ego-motion of the ego vehicle based on an image captured by the sensor processor 114.

In some aspects of the present disclosure, the instructions loaded in the NPU 108 may include code to build multi-view machine learning datasets from fleet data. The instructions loaded in the NPU 108 may include code to detect a pair of vehicles within a vicinity of one another, and having overlapping viewing frustums of a scene. The instructions loaded in the NPU 108 may further include code to trigger a capture of sensor data from the pair of vehicles. The instructions loaded in the NPU 108 may also include code to synchronize the sensor data captured by the pair of vehicles. The instructions loaded in the NPU 108 may further include code to register the sensor data captured by the pair of vehicles within a shared coordinate system to form a multi-view dataset of the scene.

Figure 2:
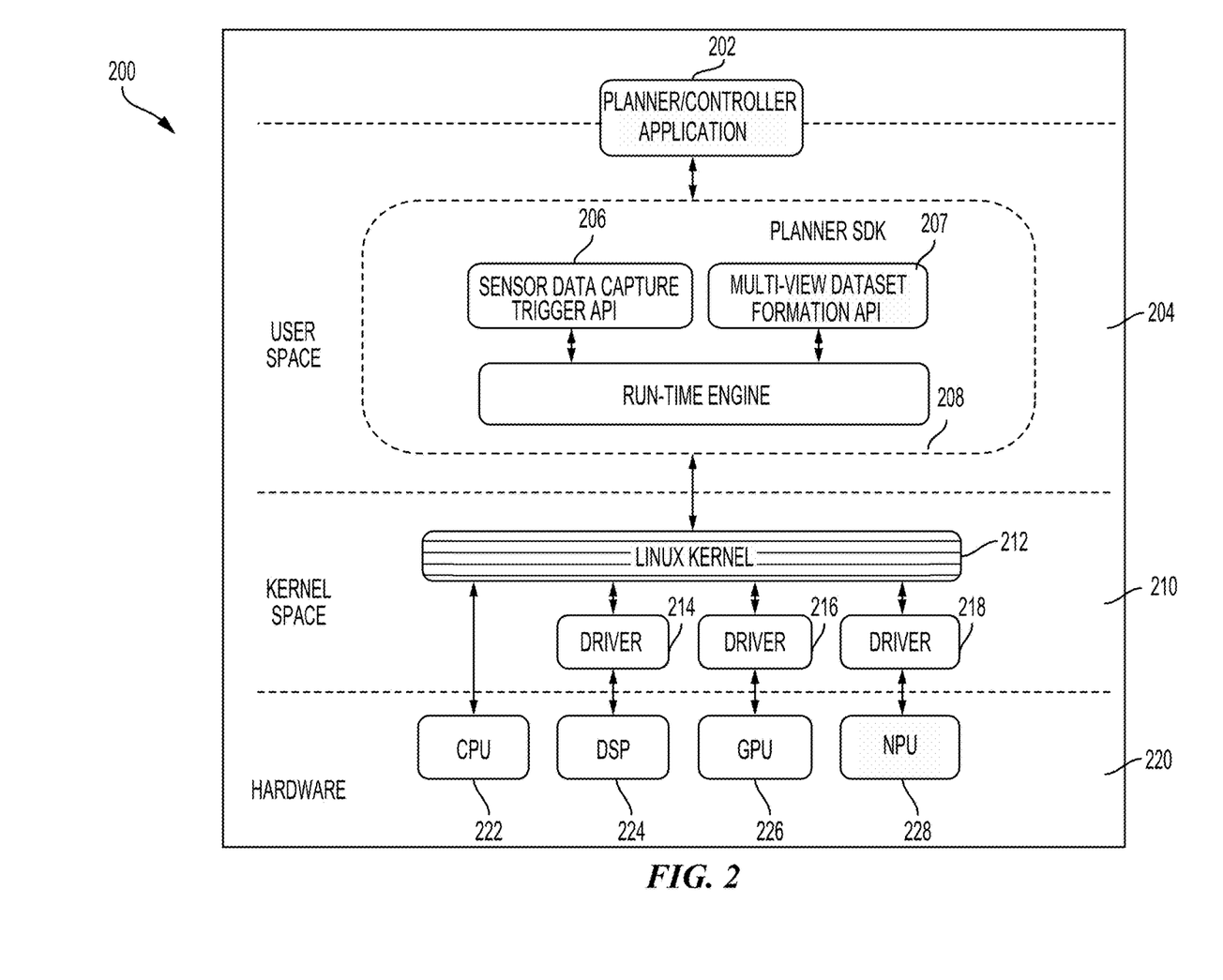
FIG. 2 is a block diagram illustrating a software architecture that may modularize functions for multi-view machine learning datasets from fleet data, according to aspects of the present disclosure.

FIG. 2 is a block diagram illustrating a software architecture 200 that may modularize functions for building multi-view machine learning datasets from fleet data, according to aspects of the present disclosure. Using the architecture, a planner/controller application 202 is designed to cause various processing blocks of a system-on-a-chip (SOC) 220 (for example a CPU 222, a DSP 224, a GPU 226, and/or an NPU 228) to perform supporting computations during run-time operation of the planner/controller application 202.

The planner/controller application 202 may be configured to call functions defined in a user space 204 that may, for example, provide for building multi-view machine learning datasets from fleet data of ego vehicles. The planner/controller application 202 may make a request to compile program code associated with a library defined in a sensor data capture trigger application programming interface (API) 206 for triggering a capture of sensor data in response to detecting a pair of vehicles within a vicinity of one another, and having overlapping viewing frustums of a scene. The planner/controller application 202 may make a request to compile program code associated with a library defined in a multi-view dataset formation API 207 for registering synchronized sensor data captured by the pair of vehicles within a shared coordinate system to form a multi-view dataset of the scene. The planner/controller application 202 may be configured to select a vehicle control action for planning a trajectory of the ego vehicle according to the multi-view dataset of the scene.

A run-time engine 208, which may be compiled code of a runtime framework, may be further accessible to the planner/controller application 202. The planner/controller application 202 may cause the run-time engine 208, for example, to perform depth and ego-motion estimation of objects in subsequent frames of a multi-camera video stream. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
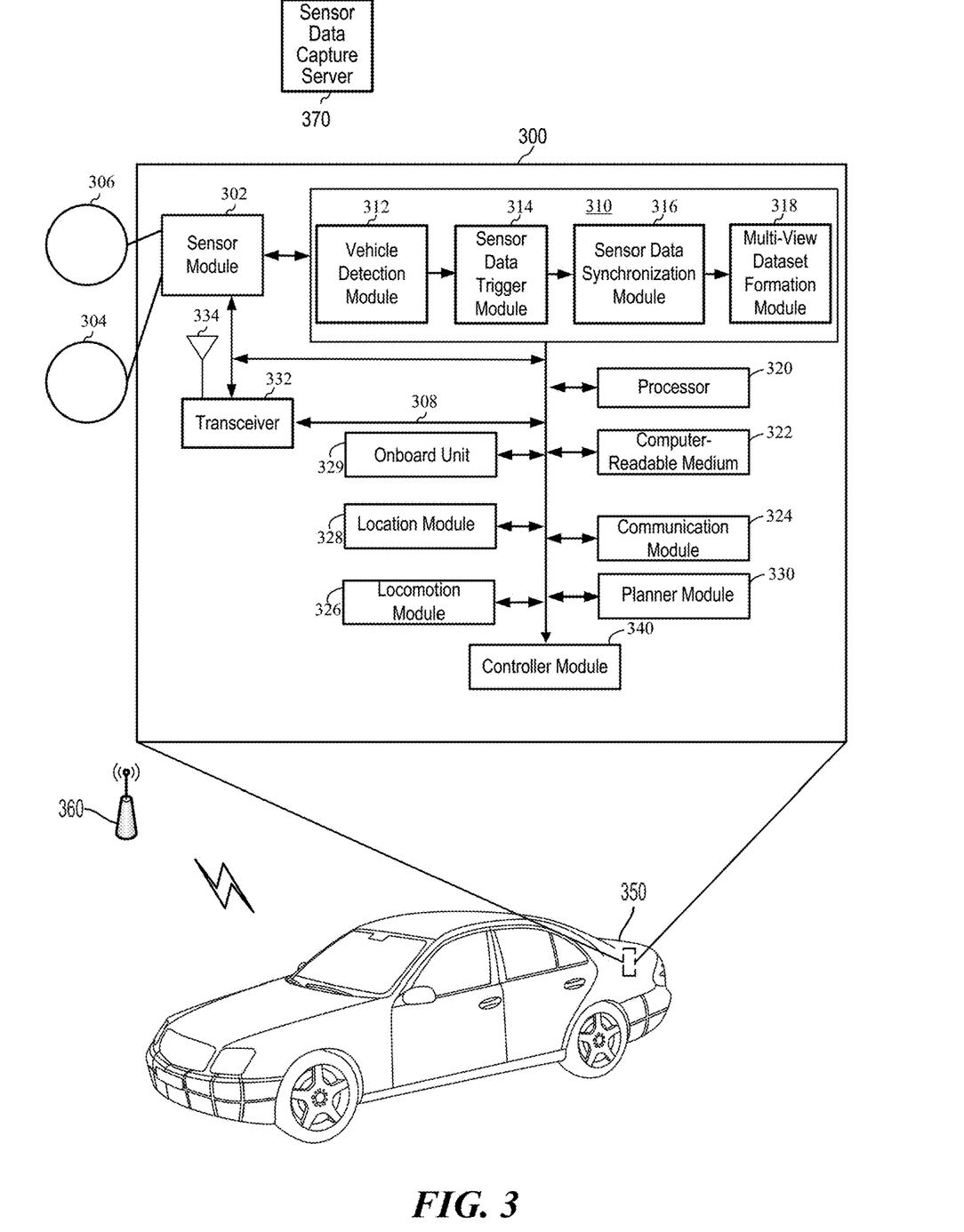
FIG. 3 diagram illustrating an example of a hardware implementation for a sensor data capture system to form multi-view machine learning datasets from fleet data, according to aspects of the present disclosure

FIG. 3 is a diagram illustrating an example of a hardware implementation for a sensor data capture system 300 to form multi-view machine learning datasets from fleet data, according to aspects of the present disclosure. The sensor data capture system 300 may be configured for training planning and control of an ego vehicle using multi-view machine learning datasets formed from fleet data. The sensor data capture system 300 may be a component of a vehicle, a robotic device, or other device. For example, as shown in FIG. 3, the sensor data capture system 300 is a component of the car 350. Aspects of the present disclosure are not limited to the sensor data capture system 300 being a component of the car 350, as other devices, such as a bus, motorcycle, or other like vehicle, are also contemplated for using the sensor data capture system 300. The car 350 may be an autonomous or semi-autonomous, connected vehicle.

As noted, the sensor data capture system 300 may be implemented in a connected vehicle, according to aspects of the present disclosure. Connected vehicle applications enable support for intelligent transportation systems (ITS). In general, ITS are advanced applications integrating telecommunications, electronics, and information technologies to support connected vehicles. ITS applications apply transport engineering to plan, design, operate, maintain, and manage transport systems of a connected vehicle. In particular, these ITS applications provide improved user information and increased safety by coordinating "smarter" use of transport networks.

Connected vehicle applications support vehicle-to-vehicle (V2V) communications and vehicle-to-infrastructure (V2I) communications with wireless technology. For example V2V communications use wireless signals to send information back and forth between other connected vehicles (e.g., location, speed, and/or direction). Conversely, V2I communications involve vehicle-to-infrastructure communications (e.g., road signs or traffic signals), generally involving vehicle safety issues. For example, V2I communications may request traffic information from a traffic management system to determine best possible routes. V2V and V2I applications for connected vehicles dramatically increase automotive safety by transforming vehicle operation. According to aspects of the present disclosure, V2V and V2I applications are used to exchange detected cyclist information.

The sensor data capture system 300 may be implemented with an interconnected architecture, represented generally by an interconnect 308. The interconnect 308 may include any number of point-to-point interconnects, buses, and/or bridges depending on the specific application of the sensor data capture system 300 and the overall design constraints of the car 350. The interconnect 308 links together various circuits including one or more processors and/or hardware modules, represented by a sensor module 302, an ego perception module 310, a processor 320, a computer-readable medium 322, communication module 324, a locomotion module 326, a location module 328, an onboard unit 329, a planner module 330, and a controller module 340. The interconnect 308 may also link various other circuits such as timing sources, peripherals, voltage regulators, and power management circuits, which are well known in the art, and therefore, will not be described any further.

The sensor data capture system 300 includes a transceiver 332 coupled to the sensor module 302, the ego perception module 310, the processor 320, the computer-readable medium 322, the communication module 324, the locomotion module 326, the location module 328, an onboard unit 329, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit the FSM 360° point cloud and/or planned actions from the ego perception module 310 to a server (not shown).

The sensor data capture system 300 includes the processor 320 coupled to the computer-readable medium 322. The processor 320 performs processing, including the execution of software stored on the computer-readable medium 322 to form multi-view machine learning datasets from fleet data, according to aspects of the present disclosure. The software, when executed by the processor 320, causes the sensor data capture system 300 to perform the various functions described for ego vehicle perception based on multi-view machine learning datasets from video captured by ego vehicles, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing 2D RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the ego perception module 310, the communication module 324, the locomotion module 326, the location module 328, an onboard unit 329, the planner module 330, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication-Physical layer using microwave at 5.9 GHz (review); EN 12795: 2002 Dedicated Short-Range Communication (DSRC)—DSRC Data link layer: Medium Access and Logical Link Control (review); EN 12834:2002 Dedicated Short-Range Communication-Application layer (review); EN 13372: 2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the parking space of the car 350. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, 5G new radio (NR), long term evolution (LTE), 3G, etc. The communication module 324 may also communicate with other components of the car 350 that are not modules of the sensor data capture system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth© communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include third generation (3G), fourth generation (4G), fifth generation (5G), long term evolution (LTE), LTE-vehicle-to-everything (V2X), LTE-driver-to-driver (D2D), Voice over LTE (VoLTE), or any other mobile data network or combination of mobile data networks. Further, the network access point 360 may include one or more IEEE 802.11 wireless networks.

The sensor data capture system 300 also includes the planner module 330 for planning a selected route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The ego perception module 310 may be in communication with the sensor module 302, the processor 320, the computer-readable medium 322, the communication module 324, the locomotion module 326, the location module 328, the onboard unit 329, the planner module 330, the transceiver 332, and the controller module 340. In one configuration, the ego perception module 310 receives sensor data from the sensor module 302. The sensor module 302 may receive the sensor data from the first sensor 304 and the second sensor 306. According to aspects of the present disclosure, the ego perception module 310 may receive sensor data directly from the first sensor 304 or the second sensor 306 to perform monocular ego-motion estimation from images captured by the first sensor 304 or the second sensor 306 of the car 350.

When an object becomes occluded in video, the location and visual structure of the object are often still predictable. In particular, developmental psychologists have demonstrated that shortly after birth, children learn how objects persist during occlusion, and evidence suggests animals perform similar reasoning. Occlusions are fundamental to computer vision, and predicting the contents behind them underlies many applications in video analysis. Current works side-step the problem of occlusions by reasoning about only the objects that are visible. For example, object completion works operate on single objects that are at least partially visible in every viewpoint, and dynamic works do not handle moving objects. Tracking applications handle invisible people/objects using linear extrapolation based on when the object was last visible or are guided with x-ray annotations, which are infeasible in the real-world.

Solving the occlusion problem involves a video representation that (a) uses evidence from the previous frames in order to (b) generate the new points that are not observed in the subsequent frames. Some aspects of the present disclosure are directed to a system and method for building multi-view machine learning datasets from fleet data to solve the occlusion problem. As described, multi-view video datasets refer to videos of the same scene captured synchronously from different viewpoints (e.g., with overlap). Aspects of the present disclosure recognize that multi-view video datasets are very valuable for machine learning to train certain types of geometry-aware models.

As shown in FIG. 3, the ego perception module 310 includes a vehicle detection module 312, a sensor data trigger module 314, a sensor data synchronization module 316, and a multi-view dataset formation module 318. The vehicle detection module 312, the sensor data trigger module 314, the sensor data synchronization module 316, and the multi-view dataset formation module 318 may be components of a same or different artificial neural network. For example, the artificial neural network is a convolutional neural network (CNN). The ego perception module 310 receives a data stream from the first sensor 304 and/or the second sensor 306. The data stream may include a 2D red-green-blue (RGB) image from the first sensor 304 and/or the second sensor 306. The data stream may include multiple frames, such as image frames.

The ego perception module 310 is configured to form multi-view machine learning datasets from fleet data using the vehicle detection module 312, the sensor data trigger module 314, the sensor data synchronization module 316, and the multi-view dataset formation module 318. In one configuration, the vehicle detection module 312 detects at least a pair of vehicles within a vicinity of one another, and having overlapping viewing frustums of a scene, such as the car 350 and another vehicle. In response to detecting the pair of vehicles, the sensor data trigger module 314 triggers the capture of sensor data from the pair of vehicles. In addition, the sensor data synchronization module 316 synchronizes the sensor data captured by the pair of vehicles.

According to aspects of the present disclosure, the multi-view dataset formation module 318 registers the sensor data captured by the pair of vehicles within a shared coordinate system to form a multi-view dataset of the scene. In some aspects of the present disclosure, the sensor data capture system 300 operates in conjunction with a sensor data capture server 370. In some aspects of the present disclosure, the sensor data capture server 370 coordinates with fleets of vehicles on the road to automatically generate a large dataset of multi-view, synchronized videos of complex road scenes, from which training data could be generated.

The generation of large datasets of multi-view, synchronized videos of complex road scenes could improve the ability, for example, to train detection and object tracking systems. These trained detection and object tracking systems can detect and track objects on the road through heavy occlusions, which is an important task for the correct estimation of road risk. Multi-view self-supervision using this form of data could also significantly reduce the specification for annotated data, as well as allowing the training of better non-line of sight estimation/prediction systems. The sensor data capture system 300 may be configured for exteroceptive sensory data. The sensor data capture system 300 may be configured for planning and control of an ego vehicle trained using a multi-view dataset generated during operation of the ego vehicle, for example, as shown in FIG. 4.

Figure 4:
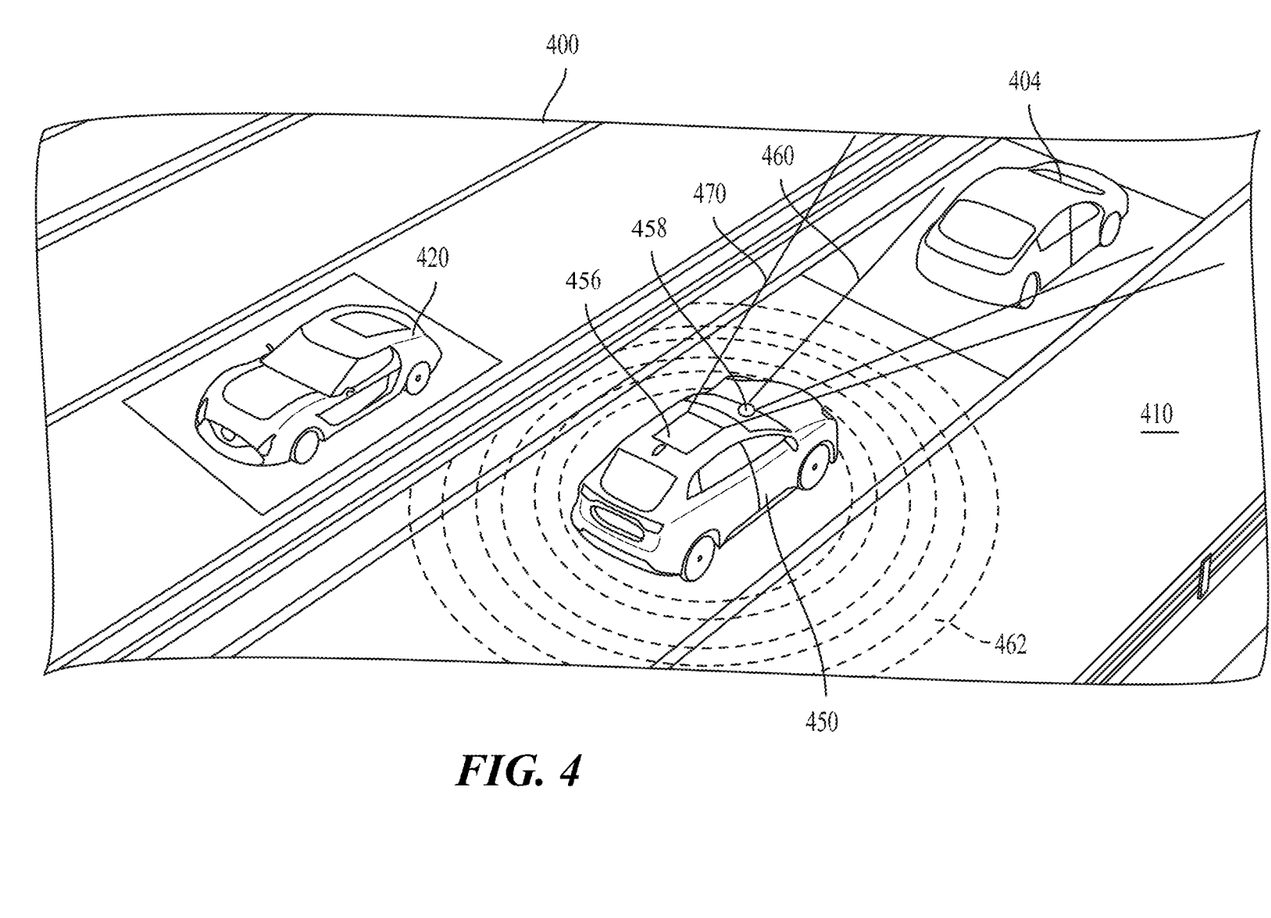
FIG. 4 illustrates an example of an ego vehicle in an environment, according to aspects of the present disclosure.

FIG. 4 illustrates an example of an ego vehicle 450 (e.g., the car 350) in an environment 400, according to aspects of the present disclosure. As shown in FIG. 4, the ego vehicle 450 is traveling on a road 410. A first vehicle 404 (e.g., other agent) may be ahead of the ego vehicle 450, and a second vehicle 420 may be adjacent to the ego vehicle 450. In this example, the ego vehicle 450 may include a 2D camera 456, such as a 2D red-green-blue (RGB) camera, and a sensor 458. The sensor 458 may be another RGB camera or another type of sensor, such as ultrasound, radio detection and ranging (RADAR), and/or light detection and ranging (LIDAR), as shown by reference number 462. Additionally, or alternatively, the ego vehicle 450 may include one or more additional sensors. For example, the additional sensors may be side facing and/or rear facing sensors.

In one configuration, the 2D camera 456 captures a 2D image that includes objects in the field of view 460 of the 2D camera 456. The sensor 458 may generate one or more output streams. The 2D image captured by the 2D camera 456 includes a 2D image of the first vehicle 404, as the first vehicle 404 is in the field of view 460 of the 2D camera 456. A field of view 470 of the sensor 458 is also shown.

The information obtained from the 2D camera 456 and the sensor 458 may be used to navigate the ego vehicle 450 along a route when the ego vehicle 450 is in an autonomous mode. The 2D camera 456 and the sensor 458 may be powered from electricity provided from the battery (not shown) of the ego vehicle 450. The battery may also power the motor of the ego vehicle 450. The information obtained from the 2D camera 456 and the sensor 458 may be used to generate a 3D representation of an environment.

When an object becomes occluded in video, the location and visual structure of the object are often still predictable. Occlusions are fundamental to computer vision, and predicting the contents behind them underlies many applications in video analysis. For example, an object in front of the first vehicle 404 may be occluded by the first vehicle 404 from the ego vehicle 450. Some aspects of the present disclosure are directed to a system and method for building multi-view machine learning datasets from fleet data to solve this occlusion problem. As described, multi-view video datasets refer to videos of the same scene captured synchronously from different viewpoints (e.g., with overlap). Aspects of the present disclosure recognize that multi-view video datasets are very valuable for machine learning to train certain types of geometry-aware models, for example, as shown in FIG. 5.

Figure 5:
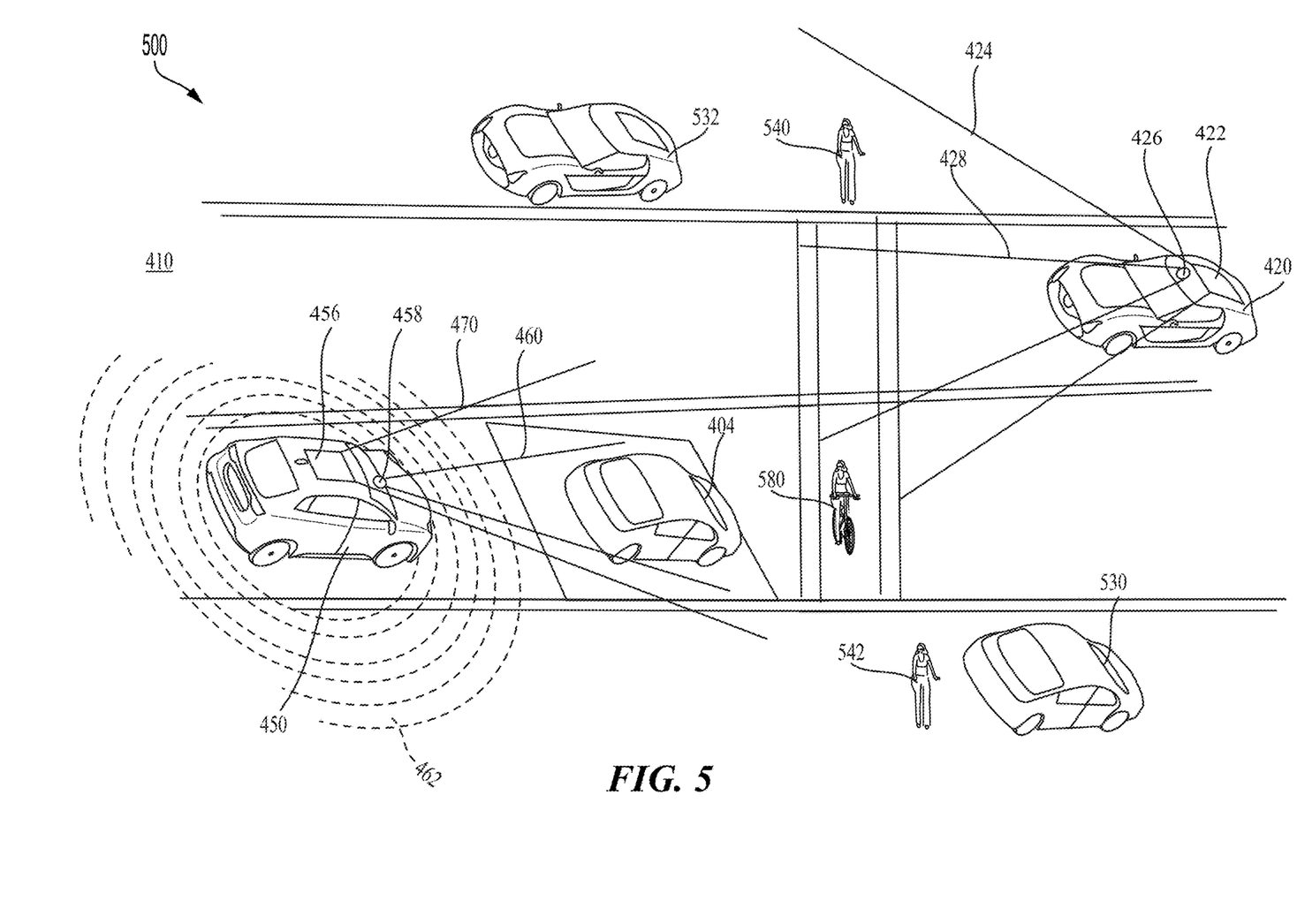
FIG. 5 is a diagram illustrating capture of a multi-view, synchronized video of a complex road scene in an environment, according to aspects of the present disclosure.

FIG. 5 is a diagram illustrating capture of a multi-view, synchronized video of a complex road scene in an environment 500, according to aspects of the present disclosure. For example, the ego vehicle 450 and the second vehicle 420 of FIG. 4 are driving in opposite directions along the road 410. In this example, the second vehicle 420 also includes a 2D camera 422 (e.g., a 2D RGB camera), and a sensor 426. In one configuration, the 2D camera 422 captures a 2D image that includes objects in a field of view 424 of the 2D camera 422. A field of view 428 of the sensor 426 is also shown.

As shown in FIG. 5, the road 410 includes parked cars 530 and 532 on both sides of the road 410 and pedestrians 540 and 542 moving in between the parked cars 530 and 532 and occasionally stepping into the road 410. Prior to the ego vehicle 450 and the second vehicle 420 passing one another, there is a period of time where they see the same scene from opposite directions. In some aspects of the present disclosure, synchronized video data is captured from both the ego vehicle 450 and the second vehicle 420. In this example, the second vehicle 420 sees a cyclist 580 that is largely occluded from the viewpoint of the ego vehicle 450. Because the data is synchronized in this aspect of the present disclosure, registration of the cameras together in space enables localization of the position of the cyclist 580 in a non-occluded view. For example, as shown in FIG. 3, the sensor data synchronization module 316 may perform simultaneous localization and mapping (SLAM) to a known map for registration of the 2D camera 456 of the ego vehicle 450 and the 2D camera 422 of the second vehicle.

In some aspects of the present disclosure, localization of the position of the cyclist 580 in a non-occluded view is performed by the sensor data synchronization module 316 using instance segmentation and monocular depth estimation, or with a range sensor. In some aspects of the present disclosure, localization of the position of the cyclist 580 in the non-occluded view provides approximate ground truth position estimation of the same cyclist in the occluded view. In response, the multi-view dataset formation module 318 forms multiple views of the environment 500 from different angles. Using the multiple views of the environment 500, it is possible to generate richer ground truth, which may be used to train more robust models. For example, a robust model may include a pedestrian detector that infers whether a pedestrian is occluded behind a vehicle due to a subtle motion or shadow signal, or a reflection from a nearby object. Another robust model example is an object tracking model for tracking objects that are barely visible from certain viewpoints.

In some aspects of the present disclosure, the sensor data capture system 300 of FIG. 3 coordinates with fleets of vehicles on the road 410 to automatically generate a large dataset of multi-view, synchronized videos of complex road scenes of the environment 500, from which training data is generated. As shown in FIG. 3, the sensor data trigger module 314 provides a trigger mechanism to trigger the synchronized capture of data from two or more vehicles within the vicinity of one another, and with overlapping viewing frustums. For example, the vehicle detection module 312 may detect at least the ego vehicle 450 and the second vehicle 420 on the road 410 shown in FIG. 5. In this example, the field of view 424 of the 2D camera 422 of the second vehicle 420 and the field of view 470 of the 2D camera 256 of the ego vehicle 450 overlap, which may be detected by the sensor data trigger module 314.

In some aspects of the present disclosure, the sensor data trigger module 314 is configured to detect certain desirable scene characteristics (e.g., scene complexity, road type, etc.) to trigger the capture of sensor data. In some aspects of the present disclosure, the sensor data trigger module 314, in conjunction with the onboard unit 329 of FIG. 3, uses vehicle to vehicle (V2V) communication to trigger sensor data capture. Alternatively, the sensor data trigger module 314 communicates with the sensor data capture server 370 when arriving at a specified location of interest to see if other vehicles are nearby (e.g., an intersection). In some aspects of the present disclosure, this sensor data capture process is performed in real-time or post-hoc, if vehicles maintain an on-board data buffer which can be queried retrospectively to extract snippets of data from the appropriate instances.

As shown in FIG. 3, the sensor data synchronization module 316 provides a synchronization mechanism to ensure that sensor data collected by the ego vehicle 450 and the second vehicle 420 is synchronized together (or the relative timing offsets are otherwise known and recorded). In these aspects of the present disclosure, the multi-view dataset formation module 318 provides a registration mechanism to localize the ego vehicle 450 and the second vehicle 420 to capture their sensory data within a shared coordinate system (e.g., a map). In some aspects of the present disclosure, an estimation mechanism is provided to estimate a noisy ground truth for a task of interest from viewpoints where the task is more confidently achievable. In addition, the multi-view dataset formation module 318 may provide a ground truth data generation mechanism to transfer the agreed upon ground truth to viewpoints where the ground truth is more difficult to estimate. A multi-view dataset formation process to enable machine learning from the multi-view dataset is further described in FIG. 7.

Figure 6A:
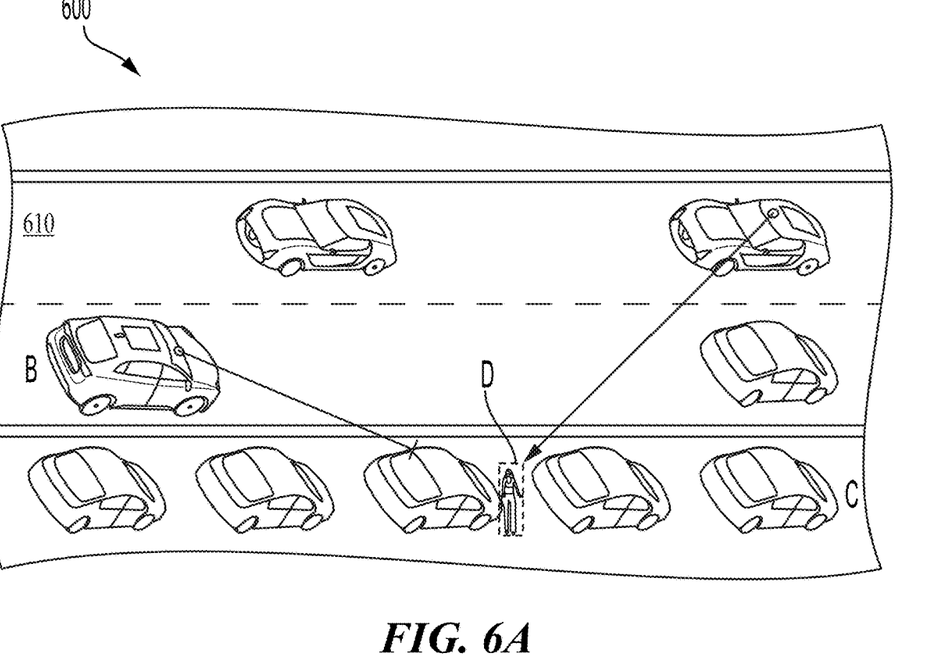
FIGS. 6A and 6B are diagrams illustrating registration of sensor data to form a multi-view dataset of the complex road scene in the environment of FIG. 5, according to aspects of the present disclosure.
Figure 6B:
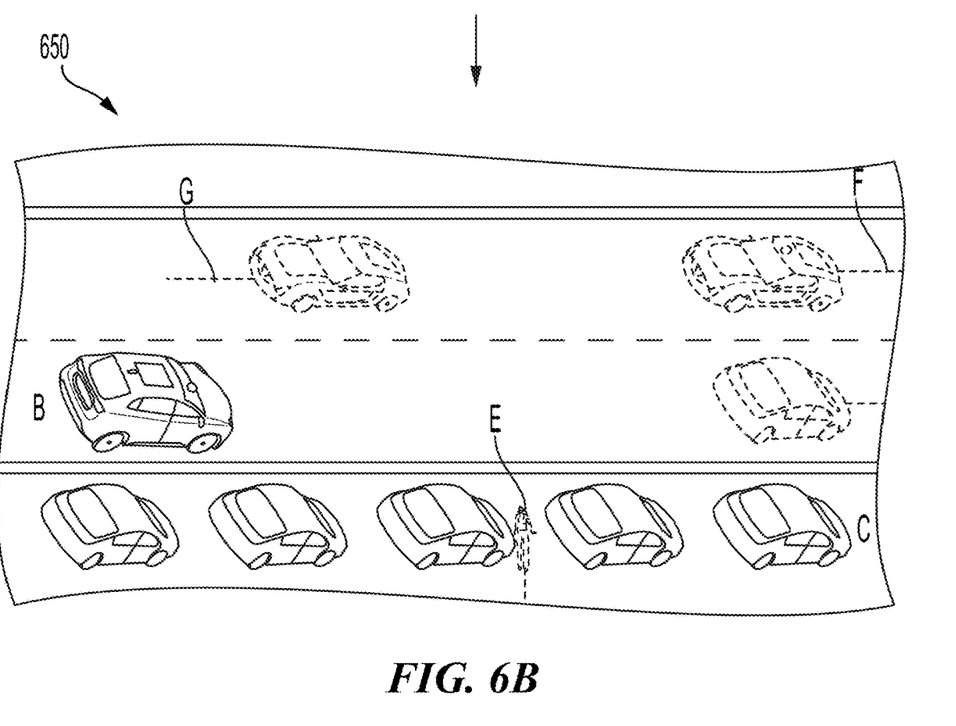

FIGS. 6A and 6B are diagrams illustrating registration of sensor data to form a multi-view dataset of a complex road scene in an environment 600, according to aspects of the present disclosure. As shown in FIG. 6A, a first vehicle A and a second vehicle B are driving in opposite directions along a road 610, including parked cars C and a pedestrian B. In this example scenario, pedestrian B is visible from the second vehicle A, but the pedestrian D is not detected by the second vehicle B. In some aspects of the present disclosure, the first vehicle A and the second vehicle B localize themselves within a shared map to form a multi-view dataset 650, as shown in FIG. 6B.

As shown in FIG. 6B, the noisy detection of the first vehicle A and the second vehicle B are registered to the shared map and fused to form a more complete and less noisy estimate of what is where in the scene in the multi-view dataset 650. As shown in FIG. 6B, the multi-view dataset 650 is illustrated from the perspective of the second vehicle B. The multi-view dataset 650 illustrates precise tracks F of the first vehicle A, as the first vehicle A self-localizes against the shared map with the second vehicle B. The multi-view dataset 650 illustrates precise tracks F of the first vehicle A, as the first vehicle A self-localizes against the shared map with the second vehicle B. The multi-view dataset 650 also illustrates precise tracks G of other agents by fusing information from the multi-view dataset 650. The multi-view dataset 650 further illustrates a ground truth track E of the pedestrian D, that is registered into a coordinate frame of the second vehicle B. In some aspects of the present disclosure, registration of the ground truth track E is used to train a detector/tracker of the second vehicle B for providing improved pedestrian detection.

Figure 7:
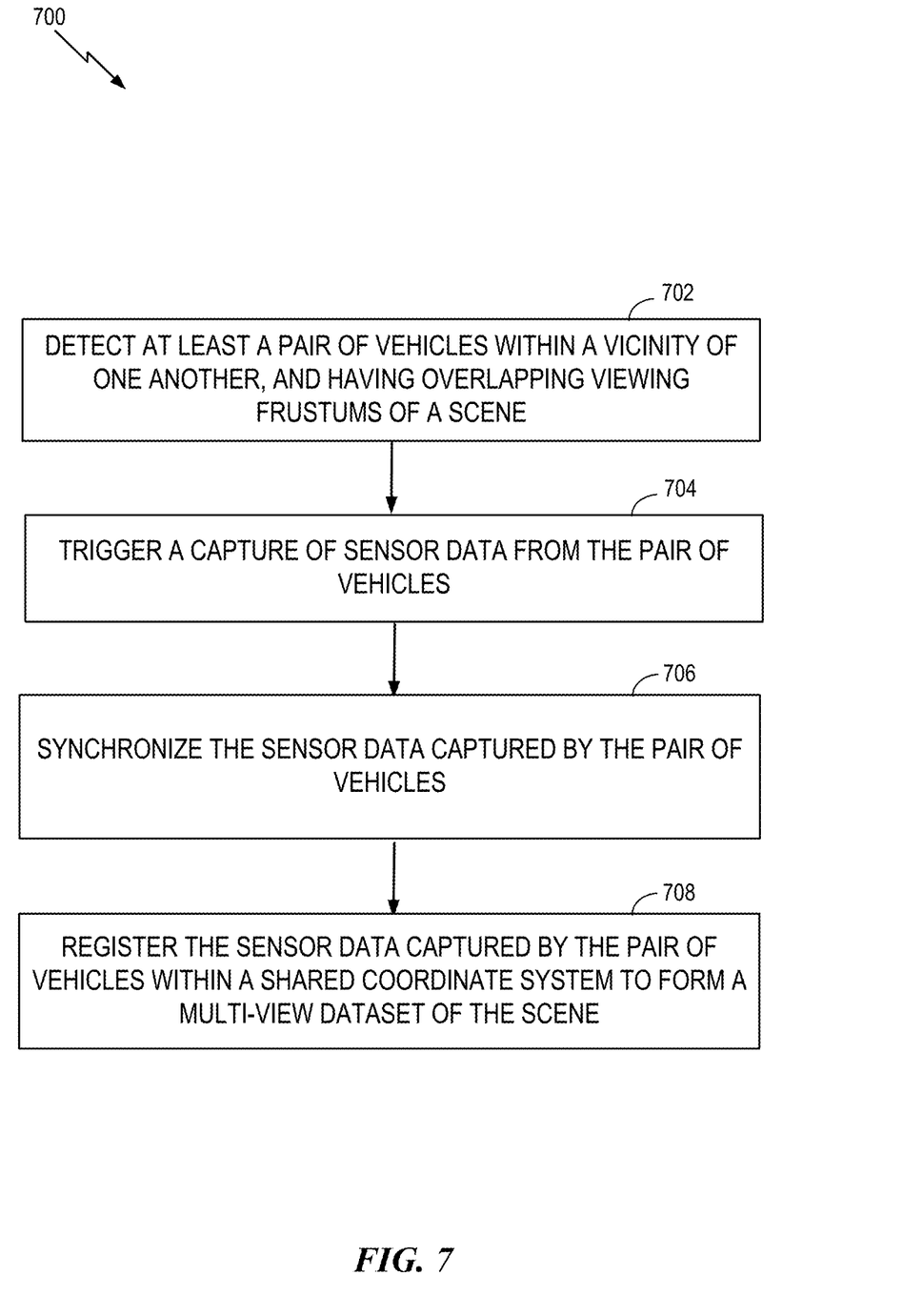
FIG. 7 is a flowchart illustrating a method for multi-view dataset formation from fleet data, according to aspects of the present disclosure.

FIG. 7 is a flowchart illustrating a method for multi-view dataset formation from fleet data, according to aspects of the present disclosure. The method 700 begins at block 702, in which a pair of vehicles are detected within a vicinity of one another, and having overlapping viewing frustums of a scene. For example, FIG. 5 shows the ego vehicle 450 and the second vehicle 420 of FIG. 4, driving in opposite directions along the road 410. In this example, the 2D camera 422 of the second vehicle 420 captures the 2D image that includes objects in a field of view 424 of the 2D camera 422. The field of view 470 of the 2D camera 456 of the ego vehicle 450 is also shown.

At block 704, a capture of sensor data from the pair of vehicles is triggered. For example, as shown in FIG. 5, prior to the ego vehicle 450 and the second vehicle 420 passing one another, there is a period of time where they see the same scene from opposite directions. As shown FIG. 3, the sensor data trigger module 314 provides a trigger mechanism to trigger the synchronized capture of data from two or more vehicles within the vicinity of one another, and with overlapping viewing frustums. For example, the vehicle detection module 312 may detect the ego vehicle 450 and the second vehicle 420 on the road 410 shown in FIG. 5. In this example, the field of view 424 of the 2D camera 422 of the second vehicle 420 and the field of view 470 of the 2D camera 456 of the ego vehicle 450 overlap, which may be detected by the sensor data trigger module 314.

At block 706, the sensor data captured by the pair of vehicles is synchronized. For example, As shown in FIG. 3, the sensor data synchronization module 316 provides a synchronization mechanism to ensure that sensor data collected by the ego vehicle 450 and the second vehicle 420 is synchronized together. In some aspects of the present disclosure, the sensor data synchronization module 316 records relative timing offsets of the capture of the sensor data from a fleet of vehicles.

At block 708, the sensor data captured by the pair of vehicles is registered within a shared coordinate system to form a multi-view dataset of the scene. For example, as shown in FIG. 3, the multi-view dataset formation module 318 provides a registration mechanism to localize the ego vehicle 450 and the second vehicle 420 to capture their sensory data within a shared coordinate system (e.g., a map). In some aspects of the present disclosure, an estimation mechanism is provided to estimate a noisy ground truth for a task of interest from viewpoints where the task is more confidently achievable. In addition, the multi-view dataset formation module 318 may provide a ground truth data generation mechanism to transfer the agreed upon ground truth to viewpoints where the ground truth is more difficult to estimate.

The method 700 performs synchronizing by recording a relative timing offset of the capture of the sensor data from the pair of vehicles. The method of claim 1, in which triggering further comprises capturing the sensor data from the pair of vehicles if overlap of the viewing frustums of the pair of vehicles are detected. The method 700 performs triggering by capturing the sensor data from the pair of vehicles in response to detecting a desirable scene characteristic. The method 700 also performs triggering by communicating between the pair of vehicles via vehicle to vehicle (V2V) communication. The method 700 also performs triggering by communicating with a central server when arriving at a specified location of interest in response to detecting another connected vehicle in the vicinity. The method 700 also includes estimating a noisy ground truth for a task of interest from viewpoints in which the task of interest is perceivable. The method 700 also includes planning a vehicle control action of an ego vehicle according to the multi-view dataset of the scene surrounding the ego vehicle.

The generation of large datasets of multi-view, synchronized videos of complex road scenes could improve the ability, for example, to train detection and object tracking systems. These trained detection and object tracking systems can detect and track objects on the road through heavy occlusions, which is an important task for the correct estimation of road risk. Multi-view self-supervision using this form of data could also significantly reduce the specification for annotated data, as well as allowing the training of better non-line of sight estimation/prediction systems. A sensor data capture system may be configured for exteroceptive sensory data. The sensor data capture system may be configured for planning and control of an ego vehicle trained using multi-view datasets generated during operation of the ego vehicle.

In some aspects of the present disclosure, the method 700 may be performed by the system-on-a-chip (SOC) 100 (FIG. 1) or the software architecture 200 (FIG. 2) of the ego vehicle 150 (FIG. 1). That is, each of the elements of the method 700 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more field-programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (TR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray© disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for multi-view dataset formation from fleet data, the method comprising:
   detecting at least a pair of vehicles within a vicinity of one another, and having overlapping viewing frustums of a scene;
   triggering a capture of sensor data from the pair of vehicles;
   synchronizing the sensor data captured by the pair of vehicles;
   registering the sensor data captured by the pair of vehicles within a shared coordinate system to form a multi-view dataset of the scene; and
   estimating a noisy ground truth for an occluded object from viewpoints of the multi-view dataset of the scene in which the occluded object is perceivable.

2. The method of claim 1, in which synchronizing further comprises recording a relative timing offset of the capture of the sensor data from the pair of vehicles.

3. The method of claim 1, in which triggering further comprises capturing the sensor data from the pair of vehicles if overlap of the viewing frustums of the pair of vehicles is detected.

4. The method of claim 1, in which triggering further comprises capturing the sensor data from the pair of vehicles in response to detecting a desirable scene characteristic.

5. The method of claim 1, in which triggering further comprises communicating between the pair of vehicles via vehicle to vehicle (V2V) communication.

6. The method of claim 1, in which triggering further comprises communicating with a central server when arriving at a specified location of interest in response to detecting another connected vehicle in the vicinity.

7. The method of claim 1, further planning a vehicle control action of an ego vehicle according to the multi-view dataset of the scene surrounding the ego vehicle.

8. A non-transitory computer-readable medium having program code recorded thereon for multi-view dataset formation from fleet data, the program code being executed by a processor and comprising:
   program code to detect at least a pair of vehicles within a vicinity of one another, and having overlapping viewing frustums of a scene;
   program code to trigger a capture of sensor data from the pair of vehicles;
   program code to synchronize the sensor data captured by the pair of vehicles;
   program code to register the sensor data captured by the pair of vehicles within a shared coordinate system to form the multi-view dataset of the scene; and
   program code to estimate a noisy ground truth for an occluded object from viewpoints of the multi-view dataset of the scene in which the occluded object is perceivable.

9. The non-transitory computer-readable medium of claim 8, in which the program code to synchronize further comprises program code to record a relative timing offset of the capture of the sensor data from the pair of vehicles.

10. The non-transitory computer-readable medium of claim 8, in which the program code to trigger further comprises program code to capture the sensor data from the pair of vehicles if overlap of the viewing frustums of the pair of vehicles is detected.

11. The non-transitory computer-readable medium of claim 8, in which the program code to trigger further comprises program code to capture the sensor data from the pair of vehicles in response to detecting a desirable scene characteristic.

12. The non-transitory computer-readable medium of claim 8, in which the program code to trigger further comprises program code to communicate between the pair of vehicles via vehicle to vehicle (V2V) communication.

13. The non-transitory computer-readable medium of claim 8, in which the program code to trigger further comprises program code to communicate with a central server when arriving at a specified location of interest in response to detecting another connected vehicle in the vicinity.

14. The non-transitory computer-readable medium of claim 9, further comprises program code to plan a vehicle control action of an ego vehicle according to the multi-view dataset of the scene surrounding the ego vehicle.

15. A system for multi-view dataset formation from fleet data, the system comprising:
   a vehicle detection module to detect at least a pair of vehicles within a vicinity of one another, and having overlapping viewing frustums of a scene;
   a sensor data trigger module to trigger a capture of sensor data from the pair of vehicles;
   a sensor data synchronization module to synchronize the sensor data captured by the pair of vehicles; and
   a multi-view dataset formation module to register the sensor data captured by the pair of vehicles within a shared coordinate system to form the multi-view dataset of the scene and to estimate a noisy ground truth for an occluded object from viewpoints of the multi-view dataset of the scene in which the occluded object is perceivable.

16. The system of claim 15, in which the sensor data synchronization module further comprises program code to record a relative timing offset of the capture of the sensor data from the pair of vehicles.

17. The system of claim 15, further comprising a planner module to plan a vehicle control action of an ego vehicle according to the multi-view dataset of the scene surrounding the ego vehicle.

\* \* \* \* \*